J. P. SMITH.
Corn Sheller.
No. 9,549. Patented Jan. 18, 1853.
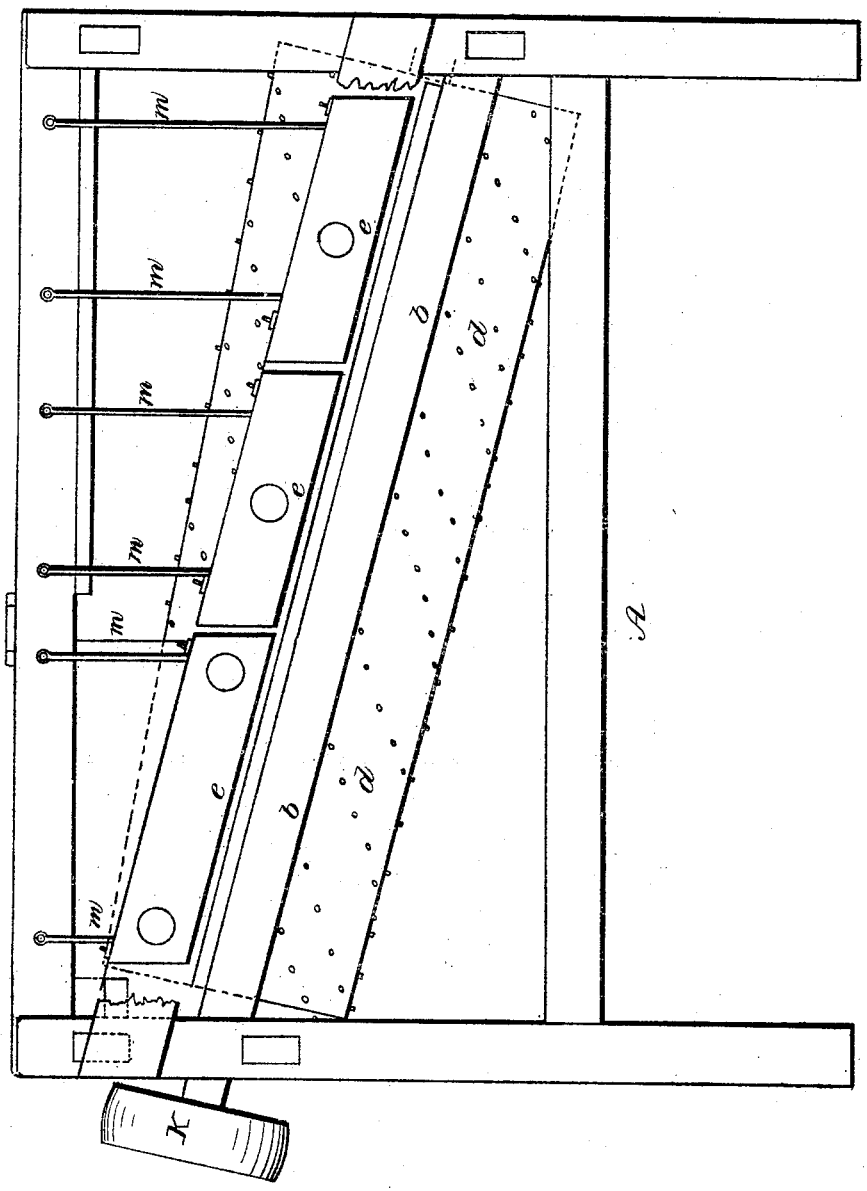

UNITED STATES PATENT OFFICE.

JEREMIAH P. SMITH, OF HUMMELSTOWN, PENNSYLVANIA.

IMPROVEMENT IN CORN-SHELLERS.

Specification forming part of Letters Patent No. 9,549, dated January 18, 1853.

*To all whom it may concern:*

Be it known that I, JEREMIAH P. SMITH, of Hummelstown, in the county of Dauphin and State of Pennsylvania, have invented a new and Improved Mode of Shelling Corn; and I do hereby declare that the following is a full and exact description thereof, reference being had to the accompanying drawing, and to the letters of reference marked thereon.

Letter A is a side view; B, a top view; C, an end view.

I will now describe the construction and operation of my invention. First, the frame is three feet long, twenty inches wide, and thirty-one inches high; $d\ d$, cylinder, two feet six inches long, eleven inches thick at the feeding end, and thirteen inches at the discharging end, with spiral rows of teeth set thereon, being placed horizontally into the frame to discharge the cobs more freely, resting on the bearing $j$, and propelled by the pulley $k$; the breast-beam $l\ l$, which is placed in juxtaposition with the cylinder, and laid in a parallel line with the cylinder to aid the discharge of the cobs more freely; the spring-blocks $e\ e\ e$, to press the corn to the cylinder by means of the springs $f\ f\ f$. The first or feeder block is plain on the face, the second and third, $i\ i$, are beveled on the feeding end. These bevels I claim as my own invention. I deem them of great importance to facilitate the discharge of the cobs. For instance, an ear of corn is put in the first block, which will consequently press the block from three-fourths to one inch back. The bevel on the second block will admit the ear freely without interrupting its speed, and also prevent the machine from choking. The supporters $m\ m\ m\ m\ m\ m$ are placed in swinging position, so as to give the spring-blocks a free movement backward and forward, and also to prevent the blocks from moving out of their proper place. These supports are made out of wrought iron and hung in staples. The straps $h\ h\ h\ h\ h\ h$ are to prevent the blocks from coming in contact with the cylinder. The coiled spring $f\ f\ f\ f$ will press the blocks to shell either thick or thin ears of corn. They are constructed of spring-steel wire. The screws $g\ g\ g\ g$ will regulate the springs, and are made of wood. The pulley $k$ is to propel the whole machine.

This machine is expressly for horse-power, and will shell from four to five hundred bushels of corn per day with ease, and is not liable to get out of order. The cylinder, being long, will admit from three to four ears of corn in the machine at the same time. Having to pass such a length, and being continually exposed to the teeth of the cylinder, which will rake it off, and make it unnecessary for the springs to be hard pressed against the corn, the corn is put in at the hopper $n$ and taken through quick. The cylinder is a solid block of wood, and lies from six to eight inches higher at the feeding end than at the discharging end.

I have made these machines for the last six months, and they have been in successful operation for the same time.

What I claim as new, and desire to secure by Letters Patent, is—

The beveled spring-blocks or shelling-bars $i\ i$ in separate pieces, in the manner and for the purpose set forth in the preamble and specification; but I do not claim to be the inventor of spring-blocks or shelling-bars.

JEREMIAH P. SMITH.

Witnesses:
JOHN PHILLIPS LOVE,
JOHN H. HUMMEL,
JESSE B. HUMMEL,
JOHN M. FOX.